June 12, 1951 P. J. MADDEX 2,556,763
PRODUCTION OF REFRACTORY METALS
Filed June 30, 1948 2 Sheets-Sheet 1

INVENTOR
Phillip J. Maddex
BY
ATTORNEY

Patented June 12, 1951

2,556,763

UNITED STATES PATENT OFFICE 2,556,763

PRODUCTION OF REFRACTORY METALS

Phillip J. Maddex, Columbus, Ohio, assignor, by mesne assignments, to Battelle Development Corporation, Columbus, Ohio, a corporation of Delaware Application June 30, 1948, Serial No. 36,097

4 Claims. (Cl. 75—84)

This invention pertains to the production of refractory metals such, for example, as titanium, zirconium, or the like, in quantities sufficient for large-scale commercial use. The method, and likewise the apparatus herein disclosed for illustrative purposes is adapted to the production of the refractory metals by both the batch method and continuously.

Heretofore, refractory metals have been produced by melting the reducing metal in the form of a pig, maintaining the reducing metal at a temperature high enough to keep it molten in an inert atmosphere (argon or helium), and adding a halide of the metal to be produced to the reducing metal, thus effecting the reduction of the halide to the metal to be produced. The chloride of the reducing metal is formed as a by-product and is then drained off into the outside atmosphere. The anhydrous chloride, as it is formed in the inert atmosphere, is quite valuable but this compound is of less value after it strikes the air and becomes hydrolyzed. The produced refractory metal is collected in a container which is removed from the apparatus only at the completion of the reaction, at which point the produced metal has collected in a solid mass within the container. Consequently, this produced refractory metal, along with the residual reducing metal and the salt of such reducing metal, must be removed from the container by boring and is limited to small scale batch processes. Such procedure is impractical for large scale production as well as having other disadvantages. For example, new reducing metal is utilized in each operation and therefore impurities are introduced each time the refractory metal production cycle is performed.

It is one object of this invention to provide a method and apparatus for producing refractory metals such as titanium, zirconium, or the like, efficiently and economically as well as in amounts sufficient for large scale commercial use, and to avoid the undesirable features of the heretofore known apparatus and processes utilized in producing such metal.

It is another object of this invention to provide a method and apparatus for producing refractory metals such as titanium, zirconium, or the like, in which the use of an inert atmosphere or a vacuum is eliminated, being replaced by the halide of the refractory metal to be produced.

Other objects and advantageous features of this invention will be apparent from the following detailed description, when read in conjunction with the accompanying drawings wherein similar characters of reference designate corresponding parts, and wherein.

Figure 1:
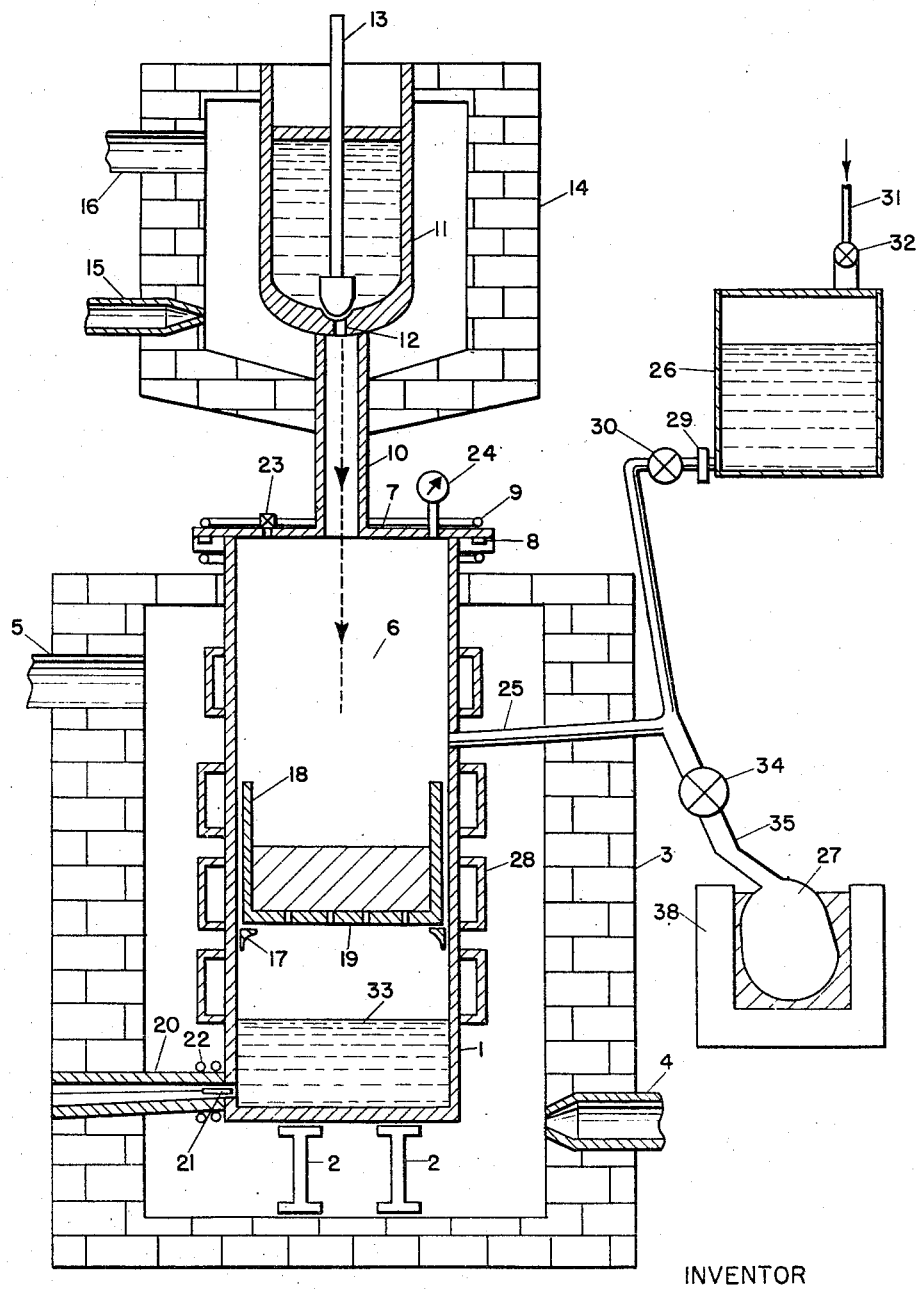
Figure 1 is a view of an apparatus which is illustrative of that which may be used in practicing this invention in producing refractory metal by the batch method.

In accordance with this invention, and as disclosed herein for illustrative purposes, a reaction chamber is provided together with means for effecting and maintaining temperatures within the reaction chamber suitable for performance of the process. Means are provided for maintaining a pressure of a halide of the refractory metal, titanium, zirconium, or the like, in a vapor state within the reaction chamber. This halide of the metal to be produced serves to expel air from the reaction chamber and leave only an atmosphere of the halide therein. Means are also provided for supplying to the reaction chamber a reducing metal from the groups of alkali or alkaline earth metals, such, for example, as magnesium, sodium, calcium, or potassium, in such condition and in such quantity that there is complete reaction between the reducing metal and the refractory metal halide to produce the refractory metal and the halide of the reducing metal.

The amount of halide of the metal to be produced, the rate of supply of the reducing metal, and the area of the container in which the reaction between the halide and the reducing metal takes place may be so correlated that the reaction will be completed, or substantially completed between the entrance point of the reducing metal and the basket or container in which the refractory metal produced and any reducing metal not reacted upon collects irrespective of the point of introduction of the reducing metal. Under such conditions there will be no pool or substantial mass of reducing metal collected in any one area to react with the halide. Consequently, the heat of reaction may be closely controlled and is substantially uniform throughout the reaction chamber.

For illustrative purposes only, the invention will be hereinafter explained as applied to the production of titanium through the reaction of a halide of titanium with molten magnesium as the reducing metal, it being understood that refractory metals, for example, zirconium, having like or similar characteristics to titanium metal may be produced, and that reducing metals from the groups of alkali or alkaline earth metals other than magnesium which are adaptable to the purpose, such as potassium, sodium or calcium, may be used.

The apparatus shown in the drawing, comprises a container 1 of steel or other suitable material supported on supports 2 in a furnace or other type of heating unit 3. The furnace shown has an inlet 4 for supplying combustibles to the furnace, and a vent 5 through which the products of combustion pass out of the furnace. A chamber 6 within the container 1 is closed at the top by a cap 7 which rests on a gasket 8, and which is removably secured to the top of the container 1 in any well known manner. The gasket 8 is cooled by passing water or other cooling media through conduits 9 disposed on either side of the gasket 8. The central portion of the cap 7 is in upstanding tubular form as at 10 which supports a pot 11 on its uppermost open end. The pot 11 has an orifice 12 in the bottom thereof through which the flow may be varied by a plug valve 13. About the pot 11 is disposed a heating unit 14 having a fuel inlet 15 and a vent 16 through which the products of combustion may pass.

Disposed within container 1 is an annular supporting ring 17 on which rests a basket 18 having a perforate or foraminous bottom 19. It will be noted that the basket 18 is positioned some distance above the bottom of the container 1. A passageway 20 under the control of a valve 21, and cooled by conduits 22 through which water or other cooling media may flow, leads from the bottom of the container 1. The cap 7 of the container 1 is equipped with a pressure relief valve 23 and a pressure gage 24 for determining the pressures within the container 1, as well as for safety precaution. Containers 26 and 27, which are provided for a purpose hereinafter apparent, are connected to container 1 through the supply pipe 25. Cooling jackets 28 are positioned around the container 1.

In the operation of this apparatus for the production of titanium, let it be assumed that the container 1 is empty save for the basket or container 18 disposed therein, the valve 21 is closed, and the plulg valve 13 controlling flow from the pot 11 through the orifice 12 and the tubular extension 10 of the cap 7 is also closed. Then, the container 1 is heated to bring the interior compartment 6 to a temperature of say 200–300° C., and a halide of titanium tetrachloride is introduced into the interior of the container 1 through conduit 25. Such titanium tetrachloride is contained within the container 26 and flows through an orifice, diagrammatically illustrated at 29, and an electrically operated valve 30, whose operation is controlled by the vapor pressure within the container 1. The titanium tetrachloride in the container 6 is under the pressure of a gas flowing through the conduit 31 and the pressure regulator 32, or the column of titanium tetrachloride is sufficiently high to produce a pressure within the container 1 of say from 1 to 5 pounds.

When the titanium tetrachloride flowing from the container 26 reaches the interior 6 of the container 1, such liquid titanium tetrachloride vaporizes under influence of heat in the container and produces a pressure within the interior of the container 1 of any desired amount, say from 1 to 5 pounds, the pressure of the titanium tetrachloride being such as to cause opening of the relief valve 23 and a purging of air from the container 1, and results in the container 1 being filled with an atmosphere of titanium tetrachloride.

After the container 1 has been purged of air and filled with an atmosphere of titanium tetrachloride, the temperature of the container 1 is raised to from 750° C. to 900° C. which is the temperature at which the reducing metal will react with the titanium tetrachloride to form titanium metal and the chloride of the reducing metal. Then, the plug valve 13 in the pot 11 is opened to permit flow of the reducing metal, which is maintained in a molten condition by the heating unit 14, through the condut 10 into the interior 6 of the container 1. The flow of reducing metal is so regulated that substantially complete reaction of this metal with the metal halide vapor is effected to produce titanium metal and magnesium chloride in the interior 6 of the container 1 between the entrance of the reducing metal and the basket 18. The titanium metal, which is in the form of primary crystals, and more or less spongy, falls within and rests upon the foraminous bottom 19 of the container 18 in which the titanium metal is collected.

Sufficient heat is derived from exothermic reaction between titanium tetrachloride and the magnesium metal to permit closing down the furnace 3, after the reaction between the reducing metal and the halide gas has proceeded for a given time. A cooling medium, such as air, may be flowed through the cooling jackets 28 to maintain the temperature in the container 1 at, or somewhat above, the reaction temperature necessary for the reaction between the magnesium metal and the titanium tetrachloride, but sufficiently low to prevent an excess of pressure to be built up within the container 1. Titanium tetrachloride is introduced through the conduit 25 at a rate controlled by the electrically operated valve 30, which is in turn controlled by the pressure in the container 1 by means of well-known pressure transmitting mechanisms. As a result, there will be at all times a positive pressure of titanium tetrachloride within the chamber 1, so as to maintain the interior of the container 1 free of air. Sufficient reducing metal is maintained within the pot 11 so that the metal will flow into the container 1 under a head pressure slightly greater than that pressure in the interior 6, or other well-known means may be utilized to effect such flow pressure. The molten metal within the top of pot 11 may be covered with a protective coating of flux, or the pot or container may have a lid and be suitably equipped for maintaining a protective atmosphere above the molten reducing metal.

The process hereinbefore described is continued with the magnesium metal and titanium tetrachloride reacting to produce titanium metal which is collected in container 18 and magnesium chloride which passes through the foraminous bottom of the container or basket 18 and into the bottom of the container 1 as shown at 33. Such magnesium chloride 33 may be drawn off from time to time and through the passageway 20 by opening the valve 21, and may be transferred to a suitable container or otherwise conserved for the production of further magnesium metal.

The foraminous bottom 19 of the basket or container 18 is such that, while magnesium chloride will pass through the bottom of the basket 18, any magnesium metal which has not been reacted with the titanium tetrachloride will be retained.

Assuming that the reaction between the magnesium metal and the titanium tetrachloride has continued until the desired or sufficient amount of titanium metal has been collected in the basket 18, the plug valve 13 is closed to cut off the flow of reducing metal to the container 1 and the valve 30 is closed to cut off the flow of further titanium tetrachloride to the container. The titanium tetrachloride atmosphere is then removed by opening the valve 34 controlling the conduit 35 leading from the supply pipe 25 to the container 27, and cooling this container 27 with the cooling element 38 to condense the metal halide atmosphere therein and create an area of low pressure. As a result substantially all of the titanium tetrachloride is withdrawn from the container 1 into the container 27 where it condenses. Any magnesium metal remaining in the basket 18 will be acted upon by the titanium tetrachloride in the container 1 to produce titanium metal and magnesium chloride.

The container 1 having been purged of titanium tetrachloride atmosphere in the manner just described, the container is further cooled down so that the cap 7 may be removed and the container or basket in which the titanium metal has been collected removed from the container. Thereafter, an empty basket or container is disposed within the container 1, the cap 7 resecured to the top of the container 1, and the process as hereinbefore described repeated.

Figure 2:
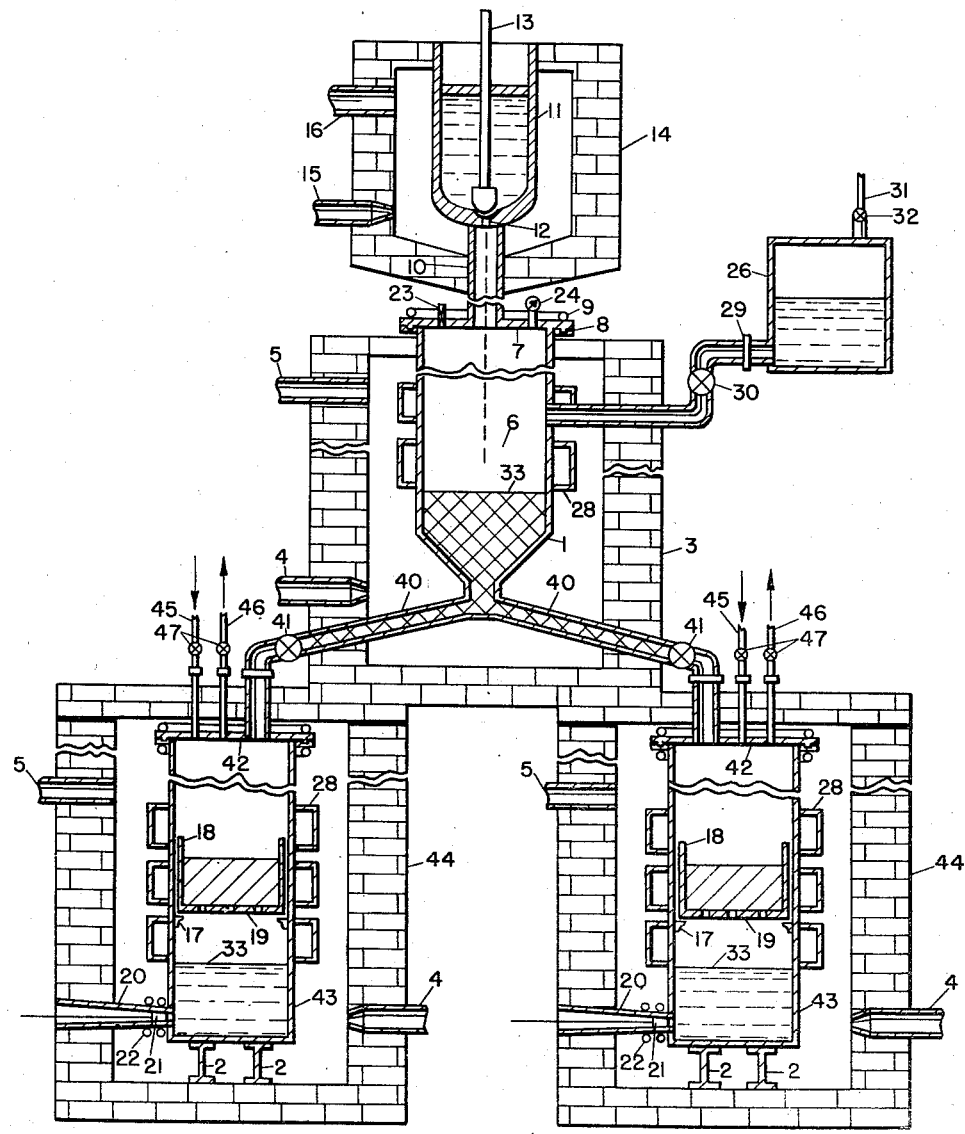
Figure 2 is an apparatus as shown in Figure 1, but modified to produce refractory metal continuously.

Referring to Figure 2 of the drawings, there is shown an apparatus identical with the apparatus just described and as shown in Figure 1 insofar as the formation of the refractory metal, titanium, is concerned. In the apparatus shown in Figure 2, however, the titanium metal collects with the magnesium chloride in the bottom of the container 1. Conduits 40 under the control of valves 41 lead from the bottom of the container 1 into removable lids or caps 42 of a pair of containers 43. Disposed in these containers 43 is a basket or container 18 having a perforate or foraminous bottom 19. The containers 43 are mounted in furnaces 44 having fuel inlets 4 and combustion product outlets 5 similarly to the furnace 3. The containers 43 are provided with outlets 20 under the control of valves 21 for drawing off the magnesium chloride.

In the operation of this apparatus, the reaction heretofore described between the reducing metal and the halide of the refractory metal to be produced is continuous in the container 1. The titanium metal and magnesium chloride collects in the lower portion of the container, with the titanium metal settling to the bottom. When the container 1 becomes so far filled with titanium metal and magnesium chloride, one of the valves 41 is opened to permit drainage of titanium metal and magnesium chloride through a conduit 40 into one of the containers 43. The containers 43 are purged of air and an atmosphere of inert gas, such as argon or helium, provided therein through the inlet pipes 45 and exhaust pipes 46, under control of valves 47, before the titanium metal and magnesium chloride from the container 1 are allowed to flow thereinto. It will be understood that to produce the above described reaction the reducing metal may be introduced below the level of the magnesium chloride if desired.

On flowing into one of the containers 43 through one of the conduits 40, the magnesium chloride and titanium metal strike the basket or container 18 with the perforate bottom 19, the magnesium chloride flowing onto the bottom of the container 43 and the titanium metal being collected in the basket or container 18. After the desired amount of titanium metal and magnesium chloride have flowed into the container 43, the valve 41 is closed and the magnesium chloride which has settled to the bottom of container 43 is drawn off through the conduit 20 under the control of valve 21. The furnace 44 which has been maintained in operation to prevent solidification of the magnesium chloride is shut off and the container 43 is cooled by passing a cooling medium through the cooling conduits 28 which surround the containers 43. Then, the pipes 40, 45, and 46 may be disconnected by means of the unions 48 and 49 and access had to the container 43 by, for example, lowering the furnace 44. Then, the caps 42 may be removed from the containers 43 and the basket 18 containing the titanium metal removed from the container. After titanium metal has been removed from the basket 18, such basket, or another one, may be inserted in the container 43, the cap 42 replaced, and the pipes 40, 45, and 46 reconnected and the interior of the container 43 purged of air and filled with an atmosphere of inert gas in preparation for receiving another charge of magnesium chloride and titanium metal from the container 1. It will be understood that as many containers 43 and associated parts may be provided as is found necessary to accommodate continuous reaction in the container 1.

The invention herein disclosed has numerous novel and advantageous features. For example, the necessity for an inert atmosphere or a vacuum in which the reaction may take place is eliminated; use is made of reaction heat; and the apparatus is greatly simplified. Other advantages will be apparent.

What is claimed is:

1. The method of producing the refractory metals titanium and zirconium, which comprises urging a confined space of air by introducing thereinto a gaseous halide of the refractory metal to be produced under pressure above atmospheric pressure, maintaining the confined space filled with the gaseous halide of the refractory metal to be produced under pressure above atmospheric pressure and to the exclusion of air, gradually feeding into said confined space, filled with the gaseous halide of the refractory metal to be produced to the exclusion of air, a reducing metal from the group consisting of the alkali and alkaline earth metals magnesium, sodium, calcium and potassium, and supplying external heat to said confined space to initiate reaction between the halide of the refractory metal to be produced and the reducing metal to thereby produce the refractory metal and a salt of the reducing metal, the gaseous halide of the refractory metal being supplied to the confined space continuously.

2. The method of producing the refractory metals titanium and zirconium, which comprises purging a confined space of air by introducing thereinto a gaseous halide of the refractory metal to be produced under pressure above atmospheric pressure, maintaining the confined space filled with the gaseous halide of the refractory metal to be produced under pressure above atmospheric pressure and to the exclusion of air, gradually feeding into said confined space, filled with the gaseous halide of the refractory metal to be produced to the exclusion of air, a reducing metal from the group consisting of the alkali and alkaline earth metals magnesium, sodium, calcium and potassium, supplying external heat to said confined space to initiate reaction between the halide of the refractory metal to be produced and the reducing metal to thereby produce the refractory metal and a salt of the reducing metal, and by which reaction exothermic heat is produced within the confined space sufficiently to at least cause continuance of such reaction, and then rendering the external heat-supplying means ineffective when the exothermic heat produced by the reaction is sufficient to maintain reaction between the reducing metal and the halide of the refractory metal to be produced, the gaseous halide of the refractory metal being supplied to the confined space continuously.

3. The method of producing the refractory metals titanium and zirconium, which comprises purging a confined space of air by introducing thereinto a gaseous halide of the refractory metal to be produced under pressure above atmospheric pressure, maintaining the confined space filled with the gaseous halide of the refractory metal to be produced under pressure above atmospheric pressure and to the exclusion of air, gradually feeding into said confined space, filled with the gaseous halide of the refractory metal to be produced to the exclusion of air, a reducing metal from the group consisting of the alkali and alkaline earth metals magnesium, sodium, calcium and potassium, supplying external heat to said confined space to initiate reaction between the halide of the refractory metal to be produced and the reducing metal to thereby produce the refractory metal and a salt of the reducing metal, and by which reaction exothermic heat is produced within the confined space sufficiently to at least cause continuance of such reaction, and then rendering the external heat-supplying means ineffective when the exothermic heat produced by the reaction is sufficient to maintain reaction between the reducing metal and the halide of the refractory metal to be produced, cooling the confined space to maintain the temperature thereof at or only slightly above the temperature necessary to produce reaction between the reducing metal and the halide of the refractory metal to be produced, the gaseous halide of the refractory metal being supplied to the confined space continuously.

4. The method of producing the refractory metals titanium and zirconium, which comprises purging a confined space of air by introducing thereinto a gaseous halide of the refractory metal to be produced under pressure above atmospheric pressure, maintaining the confined space filled with the gaseous halide of the refractory metal to be produced under pressure above atmospheric pressure and to the exclusion of air, gradually feeding into said confined space, filled with the gaseous halide of the refractory metal to be produced to the exclusion of air, a reducing metal from the group consisting of the alkali and alkaline earth metals magnesium, sodium, calcium and potassium, supplying external heat to said confined space to initiate reaction between the halide of the refractory metal to be produced and the reducing metal to thereby produce the refractory metal and a salt of the reducing metal, removing the produced refractory metal from the confined space without affecting continued reaction between the said halide and the said reducing metal, the gaseous halide of the refractory metal being supplied to the confined space continuously.

PHILLIP J. MADDEX.

REFERENCES CITED

The following references are of record in the file of this patent:

UNITED STATES PATENTS

| Number | Name | Date |
|---|---|---|
| 460,985 | Netto | Oct. 13, 1891 |
| 2,085,450 | Rohn | June 29, 1937 |
| 2,121,084 | Kruh | June 21, 1938 |
| 2,205,854 | Kroll | June 25, 1940 |
| 2,408,748 | Alexander | Oct. 8, 1946 |